(12) United States Patent
Odgaard et al.

(10) Patent No.: US 6,303,158 B1
(45) Date of Patent: Oct. 16, 2001

(54) CHROMIUM AS AN ANIMAL FEED SUPPLEMENT

(75) Inventors: Richard L. Odgaard, Urbandale; John A. Greaves, Ankeny, both of IA (US)

(73) Assignee: Kemin Industries, Inc., Des Moines, IA (US)

( * ) Notice: Subject to any disclaimer, the term of this patent is extended or adjusted under 35 U.S.C. 154(b) by 0 days.

(21) Appl. No.: 09/366,993

(22) Filed: Aug. 4, 1999

(51) Int. Cl.$^7$ .............................. A23K 1/175; A23K 1/00
(52) U.S. Cl. .............................. 426/2; 426/268; 426/648; 426/807
(58) Field of Search .............................. 426/2, 807, 648, 426/268

(56) References Cited

U.S. PATENT DOCUMENTS

| | | | |
|---|---|---|---|
| 4,315,927 | 2/1982 | Evans | 514/188 |
| 5,336,672 | 8/1994 | Southern, Jr. | 514/188 |
| 5,340,834 | * 8/1994 | Stitt | 514/505 |
| 5,614,553 | * 3/1997 | Ashmead et al. | 514/505 |
| 5,707,679 | * 1/1998 | Nelson | 426/635 |
| 5,846,581 | 12/1998 | Catron | 426/74 |
| 6,139,881 | * 10/2000 | Thompson | 426/2 |

FOREIGN PATENT DOCUMENTS

98/33398 * 8/1998 (WO).

OTHER PUBLICATIONS

Lindemann et al. Dietary chromium picolinate additions improve gain, feed and carcass characteristics in growing pigs and increase litter size in reproducing sows. J. Anim. Sci. 1995. vol. 73, pp. 457–465.

Kitchalong et al. Chromium picolinate supplementation in lamb rations: effects parameters. J. Anim. Sci. 1993, vol. 71 (Suppl. 1, p. 291 (abstract)).

O'Quinn et al. Effects of source and level of added chromium on growth performance and carcass characteristics of growing finishing pigs. J. Anim. Sci. 1998. vol. 76 (Suppl. 2, p. 125).

Boleman et al. Effect of chromium picolinate on growth, body composition, and tissue accretion in pigs. J. Anim. Sci. 1995. vol. 73, pp. 2033–2042.

White et al. 'Chromium in swine diets'. 54th Minnesota Nutrition Conference and National Renderers Technical Symposium. Sep. 20–22, 1993. pp. 251–261.

Page et al. Effect of chromium picolinate on growth and serum and carcass traits of growing–finishing pigs. J. Anim. Sci. 1995. vol. 71, pp. 656–662.

Chio et al. Chroium picolinate. RDA J. Livestock Sci. 1998. vol. 40, No. 1, pp. 105–113.

Kozloski, G. V.; De Moraes, Flores. E. M.; Martins, A. F., Use of chromium oxide in digestibility studies; Variations of the results as a function of the measurement method, Journal of the Science of Food and Agriculture, vol. 76, No. 3, p. 373–376 1998.

Gross, K. L.; Wedekind, K. J.; Kirk, C. A.; Jewell, D. E.; Schoenherr, W. L.; Blum, S. A.; Owen, K. Q., Effect of dietary carnitine or chromium on weight loss and body composition of obese dogs,J of Dairy Science,vol. 81 No. Suppl. 1 1998 pp. 175.

Swanson, K. C.; Harmon, D. L.; Jacques, K. A.; Larson, B. T.; Richards, C. J.; Bohnert, D. W.; Lewis, S. J.,Efficacy of chromium yeast supplementation for growing beef steers,J of Animal Science, vol. 76 No. Suppl. 2 1998 pp. 76.

Liu, H.; Allee, G. L.; Newcomb, M. D.; Theobald, D. E.,Effect of added chromium and different protein sources on growth performance of weaned pigs,J of Animal Science, vol. 76 No. Suppl. 2 1998 pp. 65.

Cho, Y–M.; et al.–J.,Effects of chromium picolinate, barley incorporation and restricted feeding on the growth Performance and carcass characteristics in barrows,RDA Journal of Livestock Science, vol. 40 No. 1 1998 pp. 105–113.

Samanta, A. K.; Chopra, R. C.; Atreja, P. P.; Chhabra, A.,Effect of chromium on in vitro mimosine degradation and rumen parameters of *Leucaena leucocephala* in cattle,Indian Journal of Animal Nutrition, vol. 15 No. 1 1998 pp. 75–77.

Baker, D.H.. Ideal protein for pigs. Minnesota Nutrition Conference. p. 235, 1994.

Van De Ligt, C.P.A., et al. Assessment of chromium picolinate addition and dietary energy levels on performance of growing pigs. J. Anim. Sci. 76 (Suppl 1):159 (Abstr.), 1998.

O'Quinn, P.R., et al. Effects of source and level of added chromium on growth performance and carcass characteristics of growing–finishing pigs. J. Anim. Sci. 76 (Suppl.2):56 (Abstr.). 1998.

Boleman, S.L., et al. Effect of chromium picolinate on growth, body composition, and tissue accretion in pigs. J. Anim. Sci. 73:2033–2042, 1995.

Danielsson, D. A.; Pehrson, B.,Effects of chromium supplementation on the growth and carcass quality of bulls fed a grain–based diet during the finishing period,Zentralbl Veterinarmed A,vol. 45 No. 4 1998 May pp. 219–224.

(List continued on next page.)

Primary Examiner—Chhaya D. Sayala
(74) Attorney, Agent, or Firm—Kent A. Herink; Daniel A. Rosenberg

(57) ABSTRACT

Chromium, preferably in the form of chromium propionate, is used as an animal feed supplement. The addition of chromium to a diet containing a balanced level of dietary energy results in an increase in animal growth performance relative to the level of dietary energy and/or improved meat quality.

8 Claims, 4 Drawing Sheets

OTHER PUBLICATIONS

Kegley, E. B.; Spears, J. W.; Eisemann, J. H.,Performance and glucose metabolism in calves fed a chromium–nicotinic acid complex or chromium chloride,J Dairy Science,vol. 80 No. 8 1997 Aug pp. 1744–1750.

Chang, X.; Mallard, B. A.; Mowat, D. N.,Effects of chromium on health status, blood neutrophil phagocytosis and in vitro lymphocyte blastogenesis of dairy cows, Veterinary Immunology Immunopathology, vol. 52 No. 1–2 Jun. 15, 1996 pp. 37–52.

Chang, G. X.; Mallard, B. A.; Mowat, D. N.; Gallo, G. F.,Effect of supplemental chromium on antibody responses of newly arrived feeder calves to vaccines and ovalbumin, Can J Vet Research,vol. 60 No.2 Apr. 1996 pp. 140–144.

Wenk, C.; Gebert, S.; Pfirter, H. P.,Chromium supplements in the feed for growing pigs and meat quality (German),Arch Tierernahr,vol. 48 No. 1–2 1995 pp. 71–81.

Lindemann, M. D.; et al..,Dietary chromium picolinate additions improve gain:feed and carcass characteristics in growing–finishing pigs and increase litter size in reproducing sows,J Animal Science, vol. 73 No. 2 Feb. 1995 pp. 457–465.

Burton, J. L.; et al..,Effects of supplemental chromium on antibody responses of newly weaned feedlot calves to immunization with infectious bovine rhinotracheitis and parainfluenza 3 virus,Can J Vet Research,vol. 58 No. 2 Apr. 1994, pp. 148–151.

Buntin, L. D.; et al..,Influence of chromium picolinate on glucose usage and metabolic criteria in growing Holstein calves,J Animal Science,vol. 72 No. 6 Jun. 1994 pp. 1591–1599.

Evock–Clover, C. M.; et al.,Dietary chromium supplementation with or without somatotropin treatment alters serum hormones and metabolites in growing pigs without affecting growth performance,J Nutrition,vol. 123 No. 9 Sep. 1993 pp. 1504–1512.

Burton, J. L.; Mallard, B. A.; Mowat, D. N.,Effects of supplemental chromium on immune responses of periparturient and early lactation dairy cows,J Animal Science,vol. 71 No. 6 Jun. 1993 pp. 1532–1539.

Page, T. G.; Southern, L. L.; Ward, T. L.; Thompson, D. L. Jr,Effect of chromium picolinate on growth and serum and carcass traits of growing–finishing pigs,J Animal Science, vol. 71 No. 3 Mar. 1993 pp. 656–662.

Moonsie–Shageer, S.; Mowat, D. N.,Effect of level of supplemental chromium on performance, serum constituents, and immune status of stressed feeder calves,J Animal Science,vol. 71 No. 1 Jan. 1993 pp. 232–238.

Amoikon, E.K., et al., et al.. Effect of chromium tripicolinate on growth, glucose tolerance, insulin sensitivity, plasma metabolites, and growth hormone in pigs. J. Anim. Sci. 73:1123, 1995.

Kitchalong, L., et al.,. Chromium picolinate supplementation in lamb rations: Effects on performance, nitrogen balance, endocrine and metabolic parameters. J. Anim. Sci. 71(Suppl. 1):291 (Abstr.) 1993.

Yamamoto, A., O. et al.. Evidence that chromium is an essential factor for biological activity of low–molecular weight, chromium–binding substance. Biochem. Biophys. Res. Commun. 163:189–193, 1989.

NRC. 1998. Nutrient requirements of swine (10th Ed.). 1998. National Academy Press, Washington, DC.

White, M., J. et al. Chromium in swine diets. pp. 251–261 in Proceedings of the 54th Minnesota Nutrition Conference and National Renderers Technical Symposium, 1993.

Matthews, J.O., et al. Effects of dietary chromium tripicolinate or chromium propionate on growth, plasma metabolites, glucose tolerance, and insulin sensitivity in pigs. J. Anim. Sci. 75 (Suppl. 1):187 (Abstr.), 1997.

Ward, T. L., et al. 1995. Effect of dietary chromium source on growth, carcass characteristics, and plasma metabolite and hormone concentrations in growing–finishing swine. J. Anim. Sci. 73 (Suppl 1):189 (Abstr.).

Samsell, L.J. 1987. Studies on possible essential roles of chromium in ruminate. M.S. Thesis. North Carolina State Univ. Raleigh, NC.

* cited by examiner

CHROMIUM AS AN ANIMAL FEED SUPPLEMENT

BACKGROUND OF THE INVENTION

1. Field of Invention

This invention relates to a chromium supplement for animals. More particularly, the present invention relates to the supplementation to animals, particularly mammals or birds, of chromium as chromium propionate. The present invention specifically relates to the addition of chromium propionate to a diet containing a balanced level of dietary energy that results in an increase in average daily gain relative to the level of dietary energy and/or improved meat quality.

2. Background of the Prior Art

Chromium is a trace element. This trace element has been identified as a glucose tolerance factor and appears to facilitate this action of insulin in a number of animals and humans. Recent research has shown that chromium supplementation in pigs(Amoikon, E. K., J. M. Fernandez, L. L. Southern, D. L. Thompson, Jr., T. L. Ward and B. M. Olcott. 1995. Effect of chromium tripicolinate on growth, glucose tolerance, insulin sensitivity, plasma metabolites, and growth hormone in pigs. J. Anim. Sci. 73:1123.), lambs lambs (Kitchalong, L., J. M. Fernandez, L. D. Bunting, A. M. Chapa, L. S. Sticker, E. K. Amoikon, T. L. Ward, T. D. Bidner, and L. L. Southern. 1993. Chromium picolinate supplementation in lamb rations: Effects on performance, nitrogen balance, endocrine and metabolic parameters. J. Anim. Sci. 71(Suppl. 1):291 (Abstr.)), and calves(Bunting, L. D., J. M. Fernandez, D. L. Thompson, Jr., and L. L. Southern. 1994. Influence of chromium picolinate on glucose usage and metabolic criteria in growing Holstein calves. J. Anim. Sci. 72:1591.) increases the glucose disappearance rate and decreases the glucose half-life. The form that the chromium is administered in, organic or inorganic, appears to change the magnitude of the mammals' response, with the better result coming from certain organic forms of chromium. The best bioavailability results appear to be from chromium picolinate, with less bioavailability in chromium rich yeast.

Chromium has been linked to the metabolism of lipids, and protein. Chromium decreases serum triglycerides and increases high density lipoproteins. In rabbits, testing has shown that chromium decreases cholesterol and assists in removal of deposited cholesterol (Yamamoto, A., O. Wanda and S. Manabe. 1989. Evidence that chromium is an essential factor for biological activity of low-molecular weight, chromium-binding substance. Biochem. Biophys. Res. Commun. 163:189–193).

Inconsistent responses in both biological and performance animal testing, relative to the cost of supplementation, have prevented wide acceptance of dietary chromium. Suggested causes for such inconsistencies include the level and bioavailability of chromium naturally occurring in feed ingredients, duration of feeding and the historical chromium status of the pig (NRC. 1998. Nutrient requirements of swine ($10^{th}$ Ed.). 1998. National Academy Press, Washington, D.C.). Additionally, dietary amino acid levels may also affect the animal's response to chromium (White, M., J. Pettigrew, J. Zollitsch-Stelzl, and B. Crooker. 1993. Chromium in swine diets. Pp. 251–261 in Proceedings of the $54^{th}$ Minnesota Nutrition Conference and National Renderers Technical Symposium; Lindemann, M. D., C. M. Wood, A. F. Harper, E. T. Komegay, and R. A. Anderson. 1995b. Dietary chromium picolinate additions improve gain:feed and carcass characteristics in growing-finishing pigs and increase litter size in reproducing sows. J. Anim. Sci. 73:457–465). A recent study demonstrated that the chemical form of supplemental chromium may play a role in at least the level of animal response measured (Matthews, J. O., L. L. Southern, J. M. Fernandez, A. M. Chapa, L. R. Gentry and T. D. Binder. 1997. Effects of dietary chromium tripicolinate or chromium propionate on growth, plasma metabolites, glucose tolerance, and insulin sensitivity in pigs. J. Anim. Sci. 75 (Suppl. 1): 187 (Abstr.)). That study measured plasma metabolites, hormones, glucose tolerance and insulin sensitivity when pigs were supplemented with 200-ppb of either chromium picolinate or chromium propionate (in the form of KemTRACE® Chromium, a source of chromium propionate available commercially from Kemin Industries, Inc., Des Moines, Iowa) (U.S. Pat. No. 5,846,581).

Research specifically addressing the effects of chromium on pork (meat) quality is limited. Boleman (Boleman, S. L., S. J. Boleman, T. D. Bidner, T. L. Ward, L. L. Southern, J. E. Pontif and M. M. Pike. 1995. Effect of chromium picolinate on growth, body composition, and tissue accretion in pigs. J. Anim. Sci. 73:2033–2042) reported no response to water holding capacity (purge loss) or firmness/wetness sensory criteria to chromium from chromium picolinate, however shear force was increased by chromium treatment. More recently, a study at Kansas State University (O'Quinn, P. R., J. W. Smith, II, J. L. Neissen, M. D. Tokach, R. D. Goodband, and K. Q. Owen. 1998. Effects of source and level of added chromium on growth performance and carcass characteristics of growing-finishing pigs. J. Anim. Sci. 76 (Suppl. 2): 56 (Abstr.)) demonstrated both positive and negative responses to pork quality criteria in gilts, but little or no response in barrows, when fed chromium from either chromium nicotinate or chromium picolinate. Specifically, a reduction of visual color of the longisimuss dorsi muscle and saturation index (quadratic, P=0.09 and P=0.05, respectively) of gilts with increasing levels of chromium (0, 50,100, 200 and 400-ppb) from chromium nicotinate. The visual color of the longisimuss dorsi from gilts fed 200-ppb chromium from chromium nicotinate was lower (P=0.05) than from those fed 200-ppb from chromium picolinate, however chromium picolinate offered no response (P>0.15) to visual color compared to unsupplemented pigs. Also, gilts fed 200-ppb chromium from chromium picolinate had less (P=0.02) marbling (2.58 vs. 2.88%), but reduced (P=0.08) drip loss percentage (2.04 vs. 2.19%) compared to the controls. Although not significant, barrows fed 200-ppb chromium from chromium picolinate had numerically reduced (P>0.15) marbling (2.63 vs. 2.72%) and greater drip loss (3.73 vs. 3.33%) compared to barrows fed the control diet.

Likewise, research specifically addressing chromium and its potential interaction with dietary energy levels is limited. However, a recent study at the University of Kentucky (van de Ligt, C. P. A., M. D. Lindemann, and G. L. Cromwell. 1998. Assessment of chromium picolinate addition and dietary energy levels on performance of growing pigs. J. Anim. Sci. 76 (Suppl 1): 159 (Abstr.)) measured no effect from chromium from chromium picolinate or chromium× metabolizable energy (Cr×ME) concentration on the performance or carcass characteristics of growing (from 25.4 to 70.1 kg) PIC barrows.

Chromium in the form of chromium picolinate has been reported to increase swine production (Lindemann, M. D., C. M. Wood, A. F. Harper, E. T. Komegay, and R. A. Anderson. 1995b. Dietary chromium picolinate additions improve gain:feed and carcass characteristics in growing-finishing pigs and increase litter size in reproducing sows. J. Anim. Sci. 73:457–465). Chromium picolinate has been shown in U.S. Pat. No. 5,336,672 to increase egg production in poultry that have been supplemented with this type of chromium. Additionally, the effects of chromium picolinate and chromium chloride on various mammals have been studied. These effects include the growth and carcass traits and plasma metabolites of pigs (Ward, T. L., L. L. Southern, and R. A. Anderson. 1995. Effect of dietary chromium source on growth, carcass characteristics, and plasma metabolite and hormone concentrations in growing-finishing swine. J. Anim. Sci. 73 (Suppl 1): 189 (Abstr.)), the effects on performance and nitrogen balance and endocrine in lambs (Kitchalong et al., 1993), essential role of chromium in ruminants (Samsell, L. J. 1987. Studies on possible essential roles of chromium in the ruminate. M. S. Thesis. North Carolina State Univ. Raleigh, N.C.), and the effects of chromium in egg cholesterol and egg fat and egg protein in poultry.

There has been no prior reference that has suggested that providing chromium in the form of chromium propionate as a supplement to an energy balanced diet would increase the mammals production characteristics beyond that of chromium picolinate. In fact, the suggestions in the literature have been the opposite, since metal picolinates have been suggested to make metals more biologically available for absorption than other organic acids. U.S. Pat. No. 4,315,927 (1982).

In an insulin challenge test (IVICT), glucose clearance increased (P<0.02) in pigs fed KemTRACE® Chromium and tended to increase (P<0.12) in pigs fed chromium picolinate, with the glucose clearance in the KemTRACE® Chromium group increasing 18% over pigs fed chromium picolinate, and 45% over the control pigs not receiving chromium supplementation. Similarly, glucose half-life ($t_{1/2}$) was reduced (P<0.03) by 23% and 35% for the chromium picolinate and KemTRACE® Chromium treatments, respectively, when compared to the non-supplemented pigs. Matthews, J. O., L. L. Southern, J. M. Fernandez, A. M. Chapa, L. R. Gentry and T. D. Binder. 1997. Effects of dietary chromium tripicolinate or chromium propionate on growth, plasma metabolites, glucose tolerance, and insulin sensitivity in pigs. J. Anim. Sci. 75 (Suppl. 1): 187 (Abstr.)

An object of this invention is to provide a feed additive, chromium propionate, that increases the average daily gain of the animal while maintaining or reducing the dietary energy level in the diet of the animal.

Another object of this invention is to provide a feed additive that improves the meat quality of the animal, through increased marbling, reduced moisture in muscle tissue, reduced purge/drip loss, and/or improved firmness/wetness scores.

A further object of this invention is to provide a feed additive to a less energy dense feed such that the average daily gain of the mammal is maintained on a less expensive feed.

SUMMARY OF THE INVENTION

This invention relates to the use of chromium propionate as a feed supplement for mammals and birds. The invention provides a chromium supplement formed as chromium propionate which is balanced with the dietary energy level of the diet of the animal to improve the relative performance of the animal. More specifically, the invention provides a chromium supplement formed as chromium propionate which when fed to pigs allows the use of a diet with decreased metabolizable energy while maintaining the performance of the animal. Alternatively, the invention provides a chromium supplement formed as chromium propionate which when fed to pigs allows the use of a diet with increased metabolizable energy which results in improving the performance of the animal.

The present invention includes the use of chromium propionate as an animal dietary supplement to improve the quality of meat of the animal. Specifically, chromium treatment using chromium propionate results in significant pork quality responses in pigs fed either low- or high-metabolizable energy diets. Positively affected are increased marbling, reduced moisture in the longisimuss dorsi (LD) muscle, and reduced purge/drip loss. In addition, chromium propionate supplementation tends to improve firmness/wetness scores in both low- or high-metabolizable energy diets.

The present invention includes a method of increasing or maintaining the animal's growth performance while balancing the dietary energy content of the diet. The steps of this method include the steps of balancing the increased energy density of the diet with the amount of chromium propionate supplied to an animal wherein the animal's growth performance is increased or maintained. Increasing the dietary oil or fat content of the feed can increase the energy density of the diet, while decreasing the oil or fat content or substituting lower energy feedstuffs will decrease the metabolizable energy of the diet.

Supplementation with chromium propionate while increasing dietary energy concentration may lower daily feed intake of an animal which is beneficial provided the animal's growth performance is maintained. Supplementation with chromium propionate while decreasing dietary energy concentration resulting from using a lower fat and oil content and/or lower energy feedstuffs, is a method of decreasing the cost of an animal diet while maintaining or improving the performance of the animal. Supplementation with chromium propionate at low- and high-dietary energy levels improves the meat quality of the animal.

DETAILED DESCRIPTION OF THE INVENTION

Figure 1:
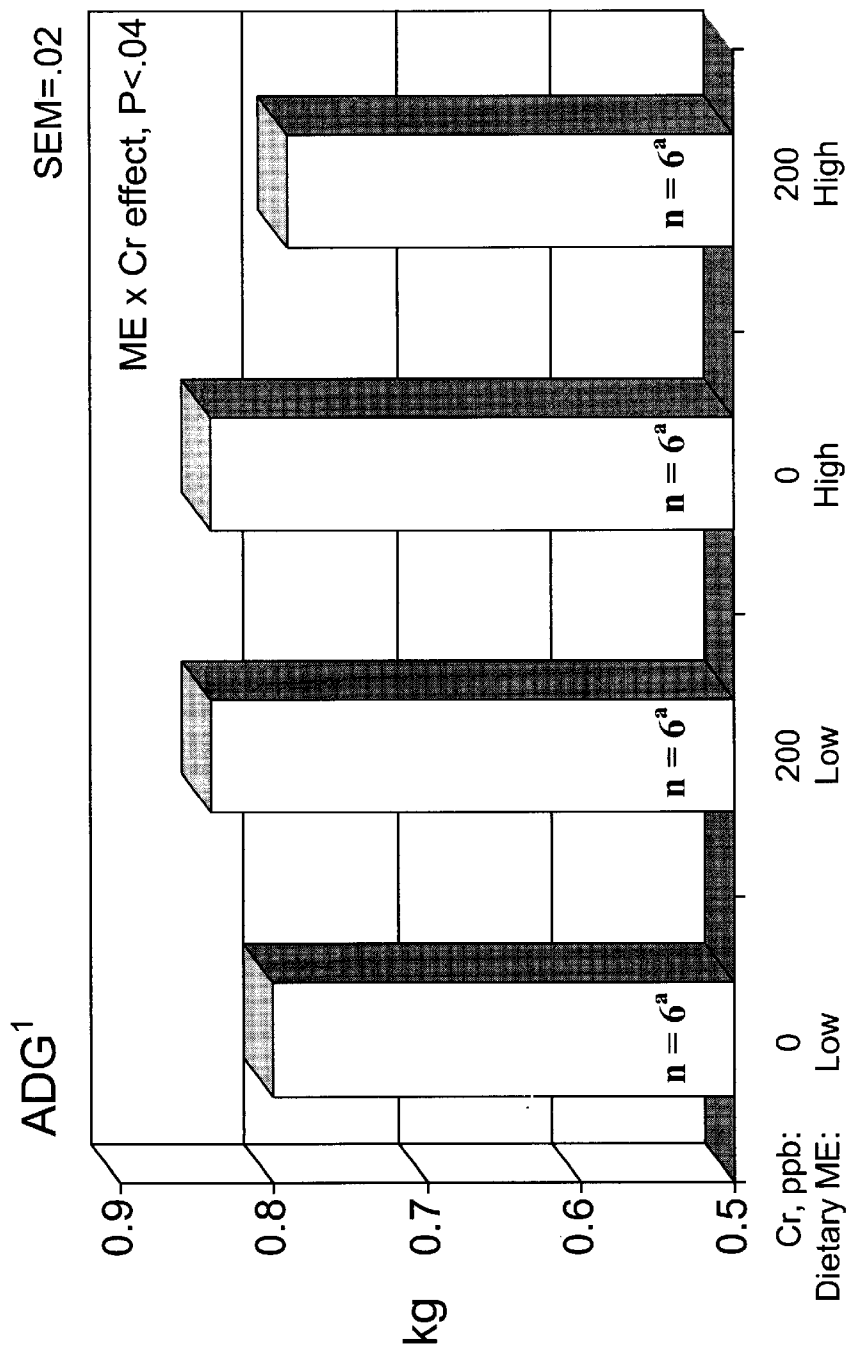
FIG. 1 is a graphical representation of the effect of chromium propionate on the average daily gain (ADG) of growing barrows.

This invention relates to the organic chromium supplement, chromium propionate. Specifically, supplements having chromium formed as an acid salt from propionic acid ($CH_3CH_2COOH$), having the structure of $Cr(CH_3CH_2COOH)_3$. The invention provides a chromium supplement formed as chromium propionate which when fed to animals can be used to effectively replace or supplement the energy available to the animal from the diet so that increased animal performance can be realized by supplementation with chromium propionate while maintaining or increasing the dietary energy of the diet, or performance can be improved or maintained while maintaining or decreasing the dietary energy content of the diet.

Oral administration of the chromium is preferred for many of the applications listed herein because of its ease. Alternatively, chromium propionate can be injected in the parental tissues or into the bloodstream or the organs or tissues or muscle of the mammal or bird directly. Additionally, the supplement can be formulated as an implant for in vivo use or the supplement can be injected into the body cavities or the gastrointestinal tract. This supplement is capable of being supplied as a diet drink or in a powdered form or in a carrier material or with appropriate diluents. This material can be formulated as a tablet or a gel or a pill or the like. The most preferred method of administration of the material is through the addition to food.

When fed as a food supplement, the amount of chromium added to the diet is between about 25 parts per billion (ppb) and about 300 ppb of the diet, with a preferred range of between about 50 ppb and abut 250 ppb, and most optimally between about 100 ppb and about 200 pb. These ranges can be used to determine acceptable amounts of chromium for supplementation through other forms of administration.

EXAMPLE I

Materials and Methods

This experiment was conducted on one-hundred forty-four PIC Cambrough-22 barrow pigs (Pig Improvement Company, Inc., Franklin, Ky.). Pigs were allotted to one of four dietary treatments in a randomized complete block design. Each treatment consisted of six replicates with six pigs per replicate with an initial mean body weight of 27 kg. A four phase grower-finisher program was used with diets formulated to provide 1.13, 0.89, 0.82 and 0.74% lysine for weight ranges of 23 to 41, 41 to 68, 68 to 95, and 95 to 118 kg, respectively (Table 1). Total sulfur amino acids, tryptophan and threonine were formulated to meet the minimum ideal ratio of Baker (Baker, D. H. 1994. Ideal protein for pigs. Minnesota Nutrition Conference. p. 235). Pigs were fed one of four treatment diets: 1) corn-soybean meal basal (B) diet, 2) B+200 ppb chromium (as KemTRACE® Chromium), 3) B+200 kcal metabolizable energy per kilogram (ME/kg) (4.5% added fat), or 4) B+200 kcal ME/kg+ 200 ppb chromium (as KemTRACE® Chromium).

TABLE 1

Composition of the Basal Diet, as-fed Basis

| Ingredient, % | Grower 1 | | Grower 2 | | Finisher 1 | | Finisher 2 | |
|---|---|---|---|---|---|---|---|---|
| | Low ME | High ME | Low ME | High ME | Low ME | High ME | Low ME | High ME |
| Corn | 54.06 | 49.09 | 63.61 | 58.64 | 66.45 | 61.49 | 69.44 | 64.47 |
| Soybean meal (48% CP) | 27.41 | 27.84 | 18.32 | 18.76 | 15.69 | 16.14 | 12.74 | 13.18 |
| Wheat midds | 15.00 | 15.00 | 15.00 | 15.00 | 15.00 | 15.00 | 15.00 | 15.00 |
| Dry fat | — | 4.50 | — | 4.50 | — | 4.50 | — | 4.50 |
| Monocalcium phosphate | 1.33 | 1.42 | .87 | .93 | .70 | .76 | .75 | .81 |
| Limestone | 1.12 | 1.09 | 1.17 | 1.14 | 1.15 | 1.12 | 1.14 | 1.11 |
| LSU trace minerals[a] | .10 | .10 | .10 | .10 | .10 | .10 | .10 | .10 |
| Selenium premix[b] | .05 | .05 | .05 | .05 | .05 | .05 | .05 | .05 |
| Salt | .40 | .40 | .40 | .40 | .35 | .35 | .30 | .30 |
| LSU vitamins[c] | .375 | .375 | .375 | .375 | .375 | .375 | .375 | .375 |
| L-Lysine HCI | .10 | .10 | .10 | .10 | .10 | .10 | .10 | .10 |
| DL-Methionine | .025 | .037 | — | .002 | .027 | .005 | — | — |
| L-Threonine | — | .004 | — | .004 | .010 | .017 | .007 | .013 |
| Total | 100 | 100 | 100 | 100 | 100 | 100 | 100 | 100 |
| Calculated composition | | | | | | | | |
| ME, Mcal/kg | 3.182 | 3.382 | 3.204 | 3.404 | 3.213 | 3.413 | 3.216 | 3.416 |
| Crude Fat, % | 3.56 | 7.88 | 3.66 | 7.98 | 3.69 | 8.01 | 3.72 | 8.04 |
| NDF, % | 12.97 | 12.53 | 13.08 | 12.64 | 13.12 | 12.68 | 13.14 | 12.70 |
| Crude protein, % | 19.97 | 19.76 | 16.45 | 16.24 | 15.47 | 15.25 | 14.30 | 14.09 |
| Lysine, % | 1.13 | 1.13 | .89 | .89 | .82 | .82 | .74 | .74 |
| TSAA, % | .68 | .68 | .56 | .55 | .56 | .53 | .51 | .49 |
| Tryptophan, % | .26 | .26 | .20 | .20 | .18 | .18 | .16 | .16 |
| Threonine, % | .74 | .74 | .60 | .60 | .57 | .57 | .52 | .52 |
| Ca, % | .80 | .80 | .70 | .70 | .65 | .65 | .65 | .65 |
| P, % | .70 | .70 | .58 | .58 | .54 | .54 | .54 | .5 |

[a]Trace mineral premix provided the following per kilogram of diet: Zn, 127 mg; Fe, 127 mg; Mn, 20 mg; Cu, 12.7 mg; I, .80 mg, as zinc sulfate, ferrous sulfate, manganese sulfate, copper sulfate, ethylenediamine dihydriodide, respectively with calcium carbonate as the carrier.
[b]Provided .3 mg of Se per kilogram of diet.
[c]Vitamin premix provided the following per kilogram of diet: vitamin A, 8,267 IU; vitamin $D_3$, 2,480 IU; vitamin E, 66 IU; menadionine (as menadionine pyrimidinol bisulfite complex) 6.2 mg; riboflavin, 10 mg; Ca d-pantothenic acid, 37 mg; niacin, 66 mg; vitamin $B_{12}$, 45 λg; d-biotin, 331 λg; folic acid, 2.5 mg; pyridoxine, 3.31 mg; thiamine, 3.31 mg; vitamin C, 83 λg.

Growth and feed intake were measured on days 23, 46, 69 and 93, corresponding to dietary phase changes. At the end of the total feed period, three pigs from each replicate were randomly selected to determine effects of dietary treatments on carcass traits and pork quality criteria. Conventional carcass data as well as estimated lean and fat by total body electrical conductance (TOBEC) was collected.

Approximately 45 minutes after slaughter, initial pH and temperature were obtained from the left side of the carcass in the longisimuss muscle at the $10^{th}$ rib. After 24 hours, ultimate pH and temperature were again obtained from the area of the carcass. After collection of all carcass data, four 1-inch chops were removed form the left side of the carcass at the $7^{th}$, $8^{th}$, $9^{th}$ and $10^{th}$ ribs. Immediately following collection of the chops, Minolta Lab color values were obtained from three orientations of the $10^{th}$ rib chop. The $10^{th}$ rib chop was also used for subjective sensory analysis (e.g. color, firmness/wetness and marbling) as well as the analysis of drip loss, cook loss and total loss following procedures set forth by Boleman (Boleman, S. L., S. J. Boleman, T. D. Bidner, T. L. Ward, L. L. Southern, J. E. Pontif and M. M. Pike. 1995. Effect of chromium picolinate on growth, body composition, and tissue accretion in pigs. J. Anim. Sci. 73:2033–2042). Approximately 22 hours after cooking, four one-half inch shears were taken and shear force determined at a speed of 100 mm/minute using an Instron (Instron Corporation, Canton, Mass.). Samples from the $9^{th}$ rib chop were taken immediately for moisture and bound water analysis. The $7^{th}$ and $8^{th}$ rib chops were frozen and stored for backup samples.

Data were analyzed by analysis of variance (ANOVA) (Steel, R. G. D., and J. H. Torrie. 1980. Principles and Procedures of Statistics: A Biometrical Approach (2nd Ed.). McGraw-Hill Publishing Co., New York) using the GLM procedure of SAS (SAS. 1985. SAS User's guide: Statistics (Version 5 Ed.). SAS Inst. Inc., Cary, N.C.). The data were analyzed as a randomized complete block design. The pen of pigs served as the experimental unit. Orthogonal single degree-of-freedom contrasts were used to determine chromium and metabolizable energy effects and the interaction of chromium and metabolizable energy.

Growth performance data (Table 2) show average daily feed intake (ADFI) was increased (P<0.05), while gain:feed tended to decrease (P=0.12) in the pigs fed the high-metabolizable energy diet during the early growing (Grower-1) period. During the same period (FIG. 1), average daily gain (ADG) was increased in pigs fed chromium with low-metabolizable energy diets, but decreased in pigs fed chromium with high-metabolizable energy diets (CrxME interaction, P<0.04). During the Finisher-2 phase, ADFI and ADG tended to decrease (P=0.12) when chromium was fed with either low- or high-metabolizable energy diets. Daily metabolizable energy intake increased (p<0.01) while the Gain:ME ratio was decreased (P<0.01) during the Grower-1 period in pigs fed high-metabolizable energy diets. Likewise, daily metabolizable energy intake increased (P<0.01) and Gain:ME ratio tended to decrease (P=0.09) during the early finishing (Finisher-1) period. During the Finisher-2 phase, dietary metabolizable energy tended to increase (P=0.11) daily metabolizable energy intake. During the same period, chromium from chromium propionate (KemTRACE® Chromium) tended to decrease (P=0.11) daily metabolizable energy intake, as it did ADFI, suggesting, along with the CrxME interaction (P<0.04) during Grower-1, an energy sparing effect may be occurring due to heightened insulin sensitivity and accelerated cellular uptake of glucose. These data are in contrast to a previously mentioned study (van de Ligt, C. P. A., M. D. Lindemann, and G. L. Cromwell. 1998. Assessment of chromium picolinate addition and dietary energy levels on performance of growing pigs. J. Anim. Sci. 76 (Suppl 1):159 (Abstr.)) in which there was no growth response to chromium from chromium picolinate, or an interaction with dietary chromium and metabolizable energy level.

TABLE 2

Effect of Chromium from Chromium Propionate and Metabolizable Energy on Growth Performance[1]

| | Chromium, ppb | | | | | | | |
| --- | --- | --- | --- | --- | --- | --- | --- | --- |
| | 0 | 200 | 0 | 200 | | | | |
| | Dietary Energy (ME) | | | | | | | |
| Item | Low | Low | High | High | SEM | Cr | ME | Cr × ME |
| Early Grower (Grower-1) | | | | | | | | |
| Average daily gain, kg/d | .80 | .84 | .84 | .79 | .02 | .89 | .79 | .04 |
| Average daily feed, kg/d | 1.66 | 1.68 | 1.81 | 1.80 | .06 | .94 | .05 | .79 |
| Gain:feed, kg:kg | .49 | .51 | .47 | .45 | .02 | .96 | .12 | .43 |
| ME intake, Mcal/d | 5.28 | 5.35 | 6.13 | 6.09 | .21 | .95 | .01 | .79 |
| Gain:ME, kg:Mcal | .153 | .159 | .138 | .132 | .008 | .98 | .02 | .43 |
| Late Grower (Grower-2) | | | | | | | | |
| Average daily gain, kg/d | .86 | .89 | .88 | .89 | .02 | .35 | .77 | .65 |
| Average daily feed, kg/d | 2.37 | 2.49 | 2.40 | 2.37 | .09 | .62 | .62 | .37 |
| Gain:feed, kg:kg | .37 | .36 | .37 | .38 | .01 | .90 | .46 | .60 |
| ME intake, Mcal/d | 7.58 | 7.98 | 8.18 | 8.05 | .28 | .64 | .26 | .38 |
| Gain:ME, kg:Mcal | .114 | .113 | .108 | .110 | .003 | .91 | .24 | .60 |
| Early Finisher (Finisher-1) | | | | | | | | |
| Average daily gain, kg/d | .99 | .99 | 1.04 | 1.02 | .03 | .86 | .23 | .67 |
| Average daily feed, kg/d | 2.82 | 2.76 | 2.97 | 2.86 | .10 | .40 | .21 | .82 |
| Gain:feed, kg:kg | .35 | .36 | .35 | .36 | .01 | .48 | .81 | .85 |

TABLE 2-continued

Effect of Chromium from Chromium Propionate and Metabolizable Energy on Growth Performance[1]

| | Chromium, ppb | | | | | | | |
|---|---|---|---|---|---|---|---|---|
| | 0 | 200 | 0 | 200 | | | | |
| | Dietary Energy (ME) | | | | | | | |
| Item | Low | Low | High | High | SEM | Cr | ME | Cr × ME |
| ME intake, Mcal/d | 9.06 | 8.85 | 10.14 | 9.76 | .33 | .40 | .01 | .80 |
| Gain:ME, kg:Mcal | .109 | .113 | .103 | .105 | .004 | .47 | .09 | .83 |
| Late Finisher (Finisher-2) | | | | | | | | |
| Average daily gain, kg/d | .96 | .94 | 1.01 | .92 | .03 | .12 | .58 | .26 |
| Average daily feed, kg/d | 3.94 | 3.77 | 4.05 | 3.71 | .15 | .12 | .88 | .61 |
| Gain:feed, kg:kg | .24 | .25 | .25 | .25 | .01 | .85 | .69 | .56 |
| ME intake, Mcal/d | 12.69 | 12.12 | 13.83 | 12.68 | .50 | .11 | .11 | .58 |
| Gain:ME, kg:Mcal | .076 | .078 | .074 | .073 | .002 | .83 | .18 | .56 |
| Overall | | | | | | | | |
| Average daily gain, kg/d | .91 | .92 | .94 | .92 | .02 | .83 | .45 | .26 |
| Average daily feed, kg/d | 2.59 | 2.59 | 2.67 | 2.60 | .06 | .60 | .50 | .57 |
| Gain:feed, kg:kg | .35 | .36 | .35 | .35 | .01 | .66 | .95 | .62 |
| ME intake, Mcal/d | 8.32 | 8.33 | 9.20 | 8.86 | .22 | .47 | .01 | .46 |
| Gain:ME, kg:Mcal | .109 | .111 | .103 | .103 | .002 | .48 | .01 | .74 |

[1]Data are the mean of six replicates of six barrows per replicate. Average initial and final body weight were 27 and 113 kg, respectively. The growth trial lasted 93 days.

Carcass response data (Table 3) from this trial reveal that pigs fed high-metabolizable energy diets throughout the growing-finishing period had thicker average backfat ($P<0.02$), less muscling ($P<0.06$), and less kilograms of lean ($P<0.05$) than did the pigs fed low-metabolizable energy diets. There tended ($P<0.09$) to be an interaction between chromium and metabolizable energy with the total ham-fat response, in that chromium treatment increased ham-fat (kg) in pigs feed low-metabolizable energy diets, while decreasing it in pigs fed high-metabolizable energy diets. There were no carcass effects measured ($P>0.25$) resulting from dietary chromium supplementation, agreeing some research findings (O'Quinn, P. R., J. W. Smith, II, J. L. Nelssen, M. D. Tokach, R. D. Goodband, and K. Q. Owen. 1998. Effects of source and level of added chromium on growth performance and carcass characteristics of growing-finishing pigs. J. Anim. Sci. 76 (Suppl. 2):56 (Abstr.), van de Ligt, C. P. A., M. D. Lindemann, and G. L. Cromwell. 1998. Assessment of chromium picolinate addition and dietary energy levels on performance of growing pigs. J. Anim. Sci. 76 (Suppl 1):159 (Abstr.)), an disagreeing with others (Lindemann, M. D., C. M. Wood, A. F. Harper, E. T. Komegay, and R. A. Anderson. 1995b. Dietary chromium picolinate additions improve gain:feed and carcass characteristics in growing-finishing pigs and increase litter size in reproducing sows. J. Anim. Sci. 73:457–465).

TABLE 3

Effect of Chromium from KemTRACE ® Chromium and Metabolizable Energy on Carcass Characteristics[1]

| | Chromium, ppb | | | | | | | |
|---|---|---|---|---|---|---|---|---|
| | 0 | 200 | 0 | 200 | | | | |
| | Dietary Energy (ME) | | | | | | | |
| Item | Low | Low | High | High | SEM | Cr | ME | Cr × ME |
| Carcass Lean and Fat Measurements | | | | | | | | |
| Loin eye area, $cm^2$ | 38.27 | 37.38 | 36.72 | 36.10 | .99 | .48 | .18 | .90 |
| Tenth rib ¾ backfat, cm | 2.18 | 2.02 | 2.38 | 2.30 | .12 | .35 | .07 | .76 |
| Average backfat, cm | 2.53 | 2.39 | 2.68 | 2.64 | .07 | .25 | .02 | .49 |
| Dressing percentage, % | 74.53 | 74.80 | 74.38 | 74.30 | .36 | .81 | .40 | .64 |
| Carcass length, cm | 85.08 | 85.37 | 84.53 | 85.08 | .38 | .30 | .30 | .75 |
| Fat-free lean, $kg^2$ | 44.58 | 44.08 | 44.92 | 43.65 | 1.02 | .42 | .97 | .72 |
| Percent lean, % | 51.84 | 51.02 | 52.31 | 51.00 | 1.17 | .40 | .86 | .84 |
| Lean gain per day, g | 352 | 353 | 356 | 350 | 11 | .86 | .97 | .75 |
| Percentage muscling, %[3] | 51.16 | 51.44 | 49.94 | 49.94 | .63 | .84 | .06 | . 84 |
| Kilograms of lean, $kg^3$ | 44.17 | 44.56 | 43.01 | 43.06 | .58 | .73 | .05 | .78 |
| Total fat, $kg^2$ | 25.08 | 26.04 | 26.65 | 25.90 | .90 | .91 | .45 | .37 |
| Percent fat, % | 29.18 | 30.10 | 31.09 | 30.26 | 1.11 | .97 | .38 | .45 |
| Lean:fat, kg:kg | 1.83 | 1.73 | 1.71 | 1.73 | .07 | .58 | .35 | .35 |

TABLE 3-continued

Effect of Chromium from KemTRACE ® Chromium and Metabolizable Energy on Carcass Characteristics[1]

| | Chromium, ppb | | | | | | | |
|---|---|---|---|---|---|---|---|---|
| | 0 | 200 | 0 | 200 | | | | |
| | Dietary Energy (ME) | | | | | | | |
| Item | Low | Low | High | High | SEM | Cr | ME | Cr × ME |
| Ham Lean and Fat Measurements | | | | | | | | |
| Ham weight, kg | 9.95 | 10.20 | 10.28 | 9.93 | .29 | .88 | .93 | .34 |
| Fat-free lean, kg[2] | 6.51 | 6.51 | 6.72 | 6.47 | .22 | .59 | .72 | .59 |
| Percent lean, % | 65.31 | 63.80 | 65.26 | 65.04 | .55 | .15 | .30 | .27 |
| Total fat, kg[2] | 1.92 | 2.12 | 2.00 | 1.97 | .07 | .25 | .60 | .09 |
| Percent fat, % | 19.42 | 20.81 | 19.58 | 19.87 | .50 | .13 | .46 | .30 |
| Butt fat thickness, cm | 1.52 | 1.64 | 1.58 | 1.62 | .06 | .26 | .71 | .54 |

[1]Data are the means of six replicates of three pigs per replicate. All data were analyzed with final body weight as a covariate. Average final body weight was 117 kg.
[2]Calculated using TOBEC analysis using equations from Higbie et al. (1997). The equations used are as follows:
Fat free lean = (−2.164 + (.172 × carcass length) + (.164 × cold PMA) − (.742 × temperature ° C.)) × 2; $R^2$ = .93
Total fat = (−9.528 + (1.181 × tenth rib fat) + (.660 × carcass side wt.) − (.132 × cold PMA) + (.465 × temp ° C.)) × 2; $R^2$ = .90
Ham fat-free lean = ((2.738 + (.121 × Cold Ham PMA) − (.089 × temperature ° C.))); $R^2$ = .95
Ham total fat = (−2.392 − (.090 × cold ham PMA) + (.671 × ham wt.) + (.072 × temp ° C.) + (.276 × butt fat)); $R^2$ = .84
[3]Calculated using the equation described by the NPPC (1991), which uses a 5% estimation for intramuscular fat and compensates for unequal body weights.

Figure 2:
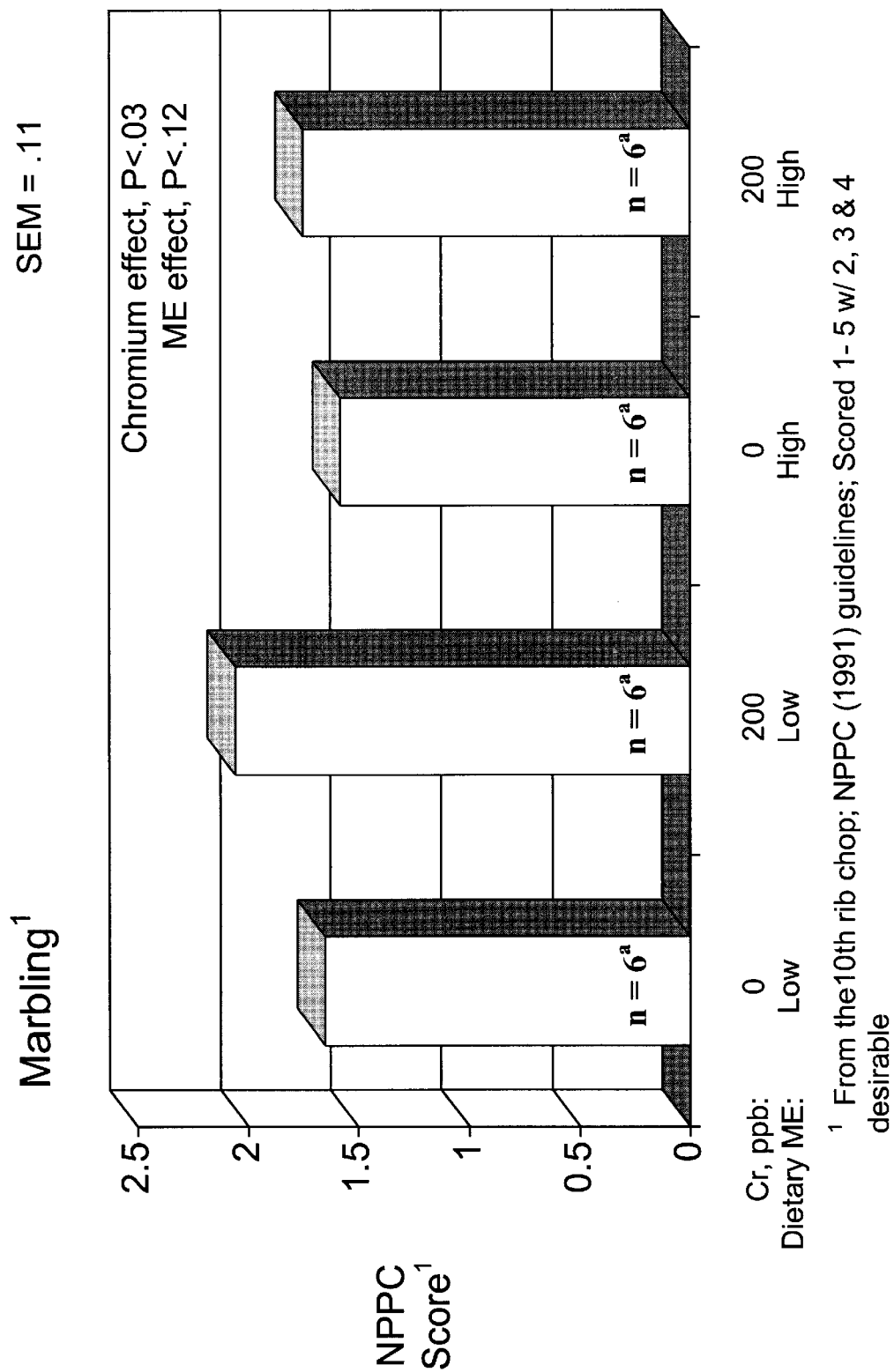
FIG. 2. is a graphical representation of the effect of chromium propionate and metabolizable energy (ME) on pork quality in barrows.
Figure 3:
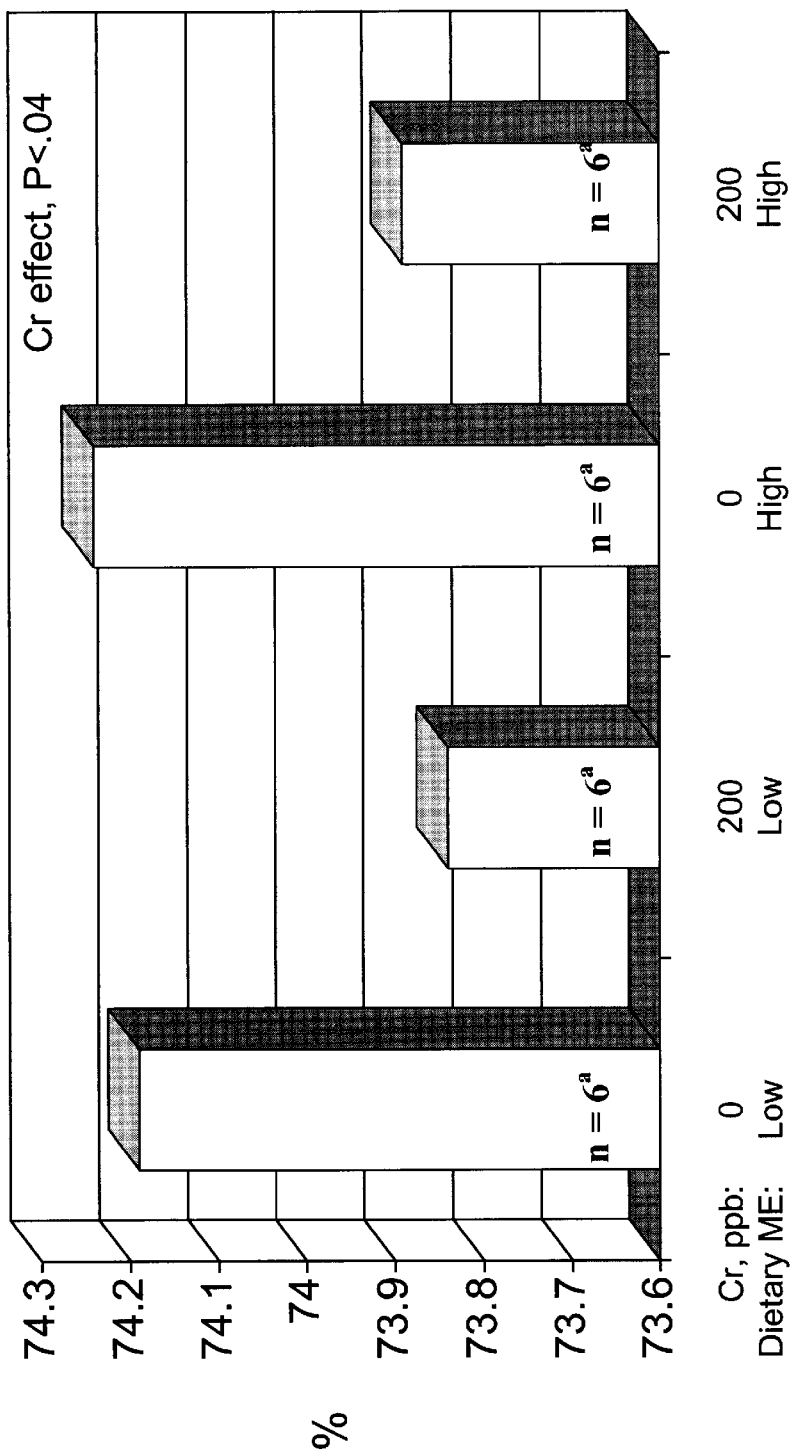
FIG. 3 is a graphical representation of the effect of chromium and metabolizable energy (ME) on pork quality in barrows.
Figure 4:
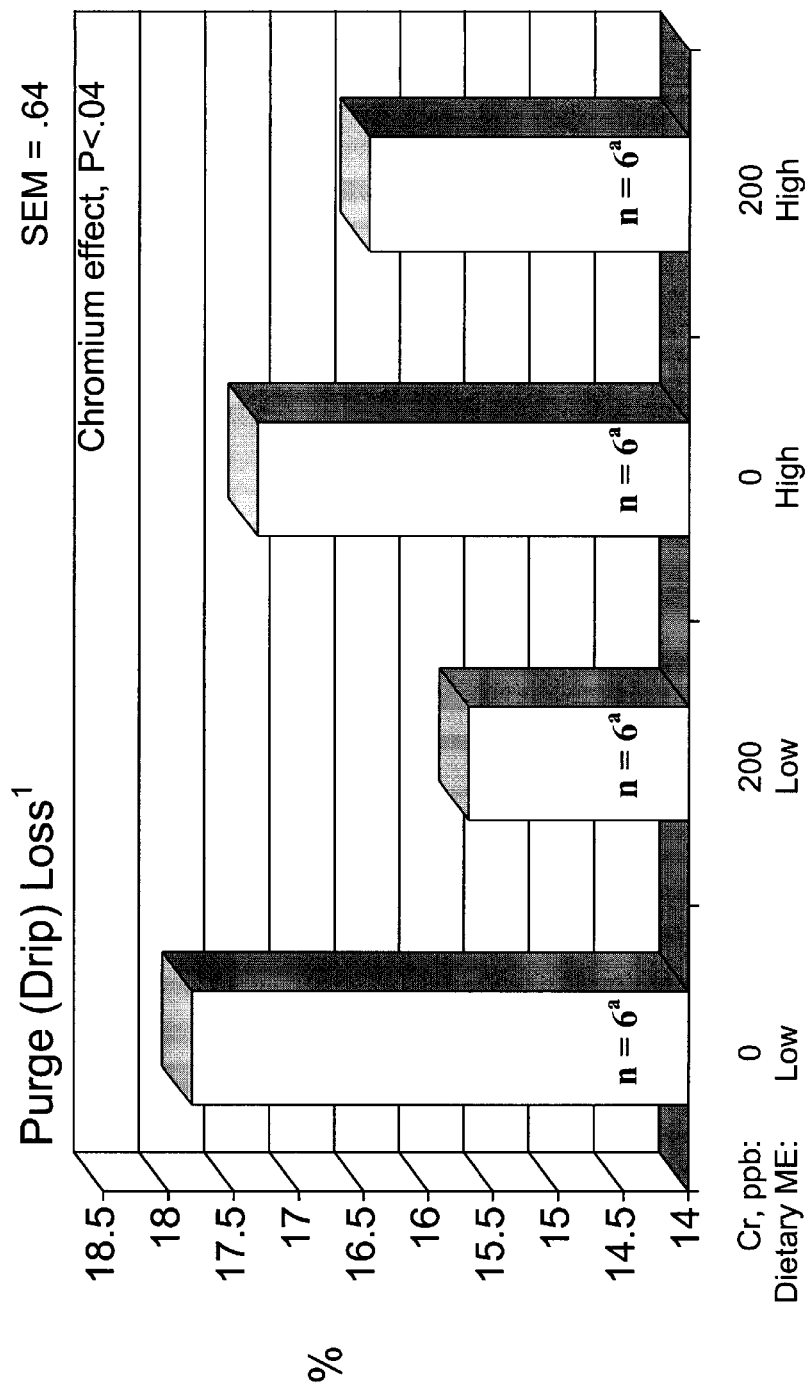
FIG. 4 is a graphical representation of the effect of chromium and metabolizable energy (ME) on pork quality in barrows.

The pork quality data (Table 4) generated in this trial offer promising opportunities for the pork industry and it's producers. Chromium treatment from chromium propionate demonstrated significant pork quality responses in this group of high-lean genotype pigs fed either low- or high-metabolizable energy diets. Positively affected were increased marbling (P<0.03; FIG. 2), reduced moisture in the longisimuss dorsi (LD) muscle (P<0.04; FIG. 3) and reduced purge/drip loss (P<0.04; FIG. 4). Interestingly, pigs supplemented with chromium from chromium propionate and fed the low-metabolizable energy diets provided a greater response to marbling (25% increase, FIG. 2) and purge loss (12% decrease, FIG. 3) compared to the non-chromium supplemented pigs, than did those pigs fed the high-metabolizable energy diets. In addition, chromium supplementation tended to improve (P=0.15) firmness/wetness scores in both metabolizable energy groups. The purge loss data are consistent, in part, with the Kansas State study (O'Quinn, P. R., J. W. Smith, II, J. L. Nelssen, M. D. Tokach, R. D. Goodband, and K. Q. Owen. 1998. Effects of source and level of added chromium on growth performance and carcass characteristics of growing-finishing pigs. J. Anim. Sci. 76 (Suppl. 0.2):56 (Abstr.)), which reported decreased (P<0.08) drip loss in gilts fed chromium from chromium picolinate, but not in barrows. The marbling data are inconsistent with the same study, which reported a decrease (P<0.02) in marbling in gilts fed chromium from chromium picolinate, with no response in barrows.

TABLE 4

Effect of Chromium from Chromium Propionate and Metabolizable Energy on Pork Quality[1]

| | Chromium, ppb | | | | | | | |
|---|---|---|---|---|---|---|---|---|
| | 0 | 200 | 0 | 200 | | | | |
| | Dietary Energy (ME) | | | | | | | |
| Item | Low | Low | High | High | SEM | Cr | ME | Cr × ME |
| pH and Temperature | | | | | | | | |
| 45 min pH[2] | 5.89 | 5.91 | 5.88 | 5.94 | .06 | .49 | .87 | .72 |
| 45 min temperature, C.[2] | 40.09 | 39.80 | 40.48 | 40.26 | .21 | .24 | .07 | .89 |
| 24 h pH[2] | 5.57 | 5.58 | 5.58 | 5.58 | .02 | .80 | 84 | 74 |
| 24 h temperature, .C[2] | 1.91 | 2.06 | 1.95 | 1.85 | .08 | .76 | .39 | .16 |
| NPPC Pork Quality | | | | | | | | |
| Color[3] | 2.46 | 2.42 | 2.22 | 2.33 | .09 | .72 | .11 | .43 |
| Firmness/wetness[3] | 2.63 | 2.69 | 2.58 | 2.89 | .12 | .15 | .54 | .35 |
| Marbling[3] | 1.65 | 2.06 | 1.58 | 1.75 | .11 | .03 | .12 | .31 |

TABLE 4-continued

Effect of Chromium from Chromium Propionate and Metabolizable Energy on Pork Quality[1]

| | Chromium, ppb | | | | | | | |
|---|---|---|---|---|---|---|---|---|
| | 0 | 200 | 0 | 200 | | | | |
| | \multicolumn{4}{c}{Dietary Energy (ME)} | | | | | |
| Item | Low | Low | High | High | SEM | Cr | ME | Cr × ME |
| Minolta Color Score | | | | | | | | |
| Longissimus dorsi (LD)L* | 54.75 | 56.18 | 56.96 | 56.47 | .63 | .47 | .07 | .15 |
| | a 2.52 | 2.69 | 2.48 | 2.89 | .24 | .26 | .75 | .65 |
| | b12.44 | 13.03 | 12.91 | 13.09 | .30 | .22 | .40 | .51 |
| Other Pork Quality Measurements | | | | | | | | |
| LD Percent moisture, %[4] | 74.19 | 73.84 | 74.24 | 73.89 | .15 | .04 | .75 | .99 |
| LD Bound water, %[4] | 87.76 | 87.59 | 86.90 | 87.56 | .59 | .69 | .47 | .49 |
| Purge loss, %[5] | 17.82 | 15.69 | 17.32 | 16.46 | .64 | .04 | .84 | .34 |
| Cook loss, %[5] | 16.58 | 16.89 | 16.54 | 17.28 | .62 | .42 | .79 | .74 |
| Total loss, %[5] | 34.40 | 32.58 | 33.86 | 33.74 | .60 | .13 | .62 | .18 |
| Shear force,[5] | 4.27 | 4.11 | 3.92 | 3.97 | .12 | .67 | .06 | .39 |

[1]Data are the mean of six replicates of three pigs per replicate.
[2]The pH and temperature measurements were taken in the *longissimus dorsi* between the 10th and 11th ribs. Time of data collection in reference to kill time was used as a covariate for pH and temperature measurements.
[3]Scores were taken on the interface of the 10th rib chop according to the guidelines of the NPPC (1991).
[4]Percentage moisture and water binding were measured on the 9th rib chop.
[5]Purge, cook, and total losses were determined on the 10th rib chop. Approximately twenty-two hours after cooking, four one-half inch shears were taken and shear force determined at a speed of 100 mm/min using an Instron.

It is understood that one chromium(III) ion is no different than any other chromium(III) ion, however, the bioavailability of the chromium(III) ion from a particular chromium containing molecule is fundamental to the animal's response. Research has recently demonstrated there are significant differences in levels of response depending upon which salt form of chromium is presented to the animal. Chromium from chromium propionate, when compared to that from chromium picolinate, has revealed significant metabolic responses, thus demonstrating excellent and reliable bioavailability (Matthews, J. O., L. L. Southern, J. M. Fernandez, A. M. Chapa, L. R. Gentry and T. D. Binder. 1997. Effects of dietary chromium tripicolinate or chromium propionate on growth, plasma metabolites, glucose tolerance, and insulin sensitivity in pigs. J. Anim. Sci. 75 (Suppl. 1):187 (Abstr.)). This particular study has clearly demonstrated what an animal's response can be when supplemented with a highly bioavailable source of chromium. Pork quality was positively affected by improved marbling (P<0.03), reduced moisture content of the longisimuss dorsi muscle (P<0.04), and reduction of costly purge/drip loss (P<0.04), all vitally important to the future of the pork industry. Additionally, the strong evidence of Cr×ME interaction promises to allow for the formulation of lower-cost, low-energy growing-finishing diets.

Low dosages of chromium in the form of propionate are possible in implementation of the present invention. Present data indicate that when chromium from chromium propionate is supplemented, there may be a level above which feed energy can not be economically increased and above which the animal's daily weight gain decreases. The maximum dietary energy concentration for an animal can be determined by running a similar experiment as indicated above for the animal in question.

The optimum dietary chromium level from chromium propionate may vary according to individual, factors of the animal including age growth potential, genetics, and the energy content of the animal's diet. Those having ordinary skill in the art, following the procedure above readily accomplish determining the optimal dosage of chromium propionate under a set of particular circumstances. Although the description above contains many specificities, these should not be construed as limiting the scope of the invention, but as merely providing illustrations of some of the presently preferred embodiments of this invention.

We claim:

1. A method for enhancing meat quality in animals, comprising, adding to a base diet, as an active ingredient, a substance including a source of chromium at a concentration which enhances meat quality of the animal.

2. A method as defined in claim 1, wherein the enhancement in meat quality comprises an increase in marbling, reduction of moisture in muscle tissue, reduced purge/drip loss, or improved firmness/wetness of the meat.

3. A method as defined in claim 1, wherein the substance is chromium propionate.

4. A method as defined in claim 2, wherein the concentration is between about 25 ppb and about 300 ppb of a base diet.

5. A method as defined in claim 2, wherein the concentration is between about 50 ppb and about 250 ppb of a base diet.

6. A method as defined in claim 2, wherein the concentration is between about 100 ppb and about 200 ppb of a base diet.

7. A method as defined in claim 2, wherein the animals are selected from the group comprising pigs and chickens.

8. A method as defined in claim 3, wherein the animals are pigs and wherein the increase in marbling is between about 1 percent and about 30 percent, the reduction in muscle moisture content is between about 0.01 and about 2 percent, the reduction in purge/drip loss is between about 1 percent and about 20 percent, and the improvement in wetness/firmness scores is between about 1 percent and about 15 percent.

* * * * *